(12) United States Patent
Haughawout et al.

(10) Patent No.: US 11,682,294 B2
(45) Date of Patent: Jun. 20, 2023

(54) SYSTEM AND METHOD FOR WIDGET-ASSISTED SETUP OF A UNIVERSAL REMOTE CONTROL

(71) Applicant: Universal Electronics Inc., Santa Ana, CA (US)

(72) Inventors: Joseph Lee Haughawout, Aliso Viejo, CA (US); Arsham Hatambeiki, Irvine, CA (US); Paul Ogaz, Cypress, CA (US); Jeffrey Kohanek, Westminster, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 272 days.

(21) Appl. No.: 15/986,489

(22) Filed: May 22, 2018

(65) Prior Publication Data

US 2018/0268686 A1 Sep. 20, 2018

Related U.S. Application Data

(63) Continuation of application No. 15/785,509, filed on Oct. 17, 2017, now Pat. No. 10,026,307, which is a
(Continued)

(51) Int. Cl.
*G08C 19/28* (2006.01)
*H04N 5/445* (2011.01)
(Continued)

(52) U.S. Cl.
CPC ............. *G08C 19/28* (2013.01); *H04N 5/445* (2013.01); *H04N 21/42204* (2013.01);
(Continued)

(58) Field of Classification Search
CPC ........ G08C 17/02; G08C 23/04; G08C 19/28; G08C 2201/92; G08C 2201/20;
(Continued)

(56) References Cited

U.S. PATENT DOCUMENTS 4,703,359 A 10/1987 Rumbolt et al.
4,959,810 A 9/1990 Darbee et al.
(Continued)

FOREIGN PATENT DOCUMENTS

WO WO 97/32290 A 9/1997
WO WO 00/17738 3/2000
(Continued)

OTHER PUBLICATIONS

European Patent Office, Extended Search Report of PCT Application No. US2010/061771, dated Jan. 30, 2014, 8 pgs.
(Continued)

*Primary Examiner* — James J Yang
(74) *Attorney, Agent, or Firm* — Greenberg Traurig, LLP

(57) ABSTRACT

A system and method for enabling set up of a controlling device capable of controlling a plurality of appliances provides an interactive instruction set and associated programming which is downloadable to a controllable appliance having an associated display, such as an Internet enabled television. The programming is accessible by the controllable appliance and is configured to appropriately display interactive instructions from the interactive instruction set to a user during a user initiated set up procedure for setting up the controlling device to communicate commands to another controllable device (e.g., a DVD, VCR, DVR, etc).

5 Claims, 14 Drawing Sheets

Related U.S. Application Data continuation of application No. 12/974,231, filed on Dec. 21, 2010, now Pat. No. 9,805,591, and a continuation-in-part of application No. 11/515,962, filed on Sep. 5, 2006, now Pat. No. 7,907,222.

(60) Provisional application No. 61/289,486, filed on Dec. 23, 2009, provisional application No. 60/715,229, filed on Sep. 8, 2005.

(51) Int. Cl.
    H04N 21/485    (2011.01)
    H04N 21/422    (2011.01)
    H04N 21/61     (2011.01)
    H04N 21/41     (2011.01)

(52) U.S. Cl.
    CPC ..... *H04N 21/42225* (2013.01); *H04N 21/485* (2013.01); *H04N 21/6125* (2013.01); *G08C 2201/20* (2013.01); *G08C 2201/30* (2013.01); *G08C 2201/92* (2013.01); *H04N 21/4135* (2013.01); *H04N 21/42226* (2013.01)

(58) Field of Classification Search
    CPC ............ G08C 2201/30; G08C 2201/21; H04L 12/282; H04N 5/4403; H04N 21/42204; H04N 21/43615; H04N 21/485; H04N 5/44582; H04N 21/4126
    See application file for complete search history.

(56) References Cited

U.S. PATENT DOCUMENTS

| | | |
|---|---|---|
| 4,998,292 A | 3/1991 | Eigeldinger et al. |
| 5,255,313 A | 10/1993 | Darbee |
| 5,341,166 A | 8/1994 | Garr et al. |
| 5,481,256 A | 1/1996 | Darbee et al. |
| 5,552,917 A | 9/1996 | Darbee et al. |
| 5,614,906 A | 3/1997 | Hayes et al. |
| 5,835,156 A | 11/1998 | Blonstein et al. |
| 5,889,506 A | 3/1999 | Lopresti et al. |
| 5,959,751 A | 9/1999 | Darbee et al. |
| 6,005,490 A | 12/1999 | Higashihara |
| 6,008,735 A | 12/1999 | Chiloyan et al. |
| 6,014,092 A | 1/2000 | Darbee et al. |
| 6,127,961 A | 10/2000 | Stacy et al. |
| 6,177,931 B1 | 1/2001 | Alexander et al. |
| 6,208,341 B1 | 3/2001 | van Ee et al. |
| 6,208,384 B1 | 3/2001 | Schultheiss |
| 6,211,870 B1 | 4/2001 | Foster |
| 6,344,817 B1 | 2/2002 | Verzulli |
| 6,473,099 B1 | 10/2002 | Goldman et al. |
| 6,597,374 B1 | 7/2003 | Baker et al. |
| 6,633,281 B2 | 10/2003 | Lin et al. |
| 6,650,248 B1* | 11/2003 | O'Donnell ....... H04N 21/42225 348/E5.103 |
| 6,690,392 B1 | 2/2004 | Wugoski |
| 6,795,130 B2 | 9/2004 | Shibamiya |
| 6,909,378 B1* | 6/2005 | Lambrechts ........... G08C 19/28 340/4.32 |
| 6,940,562 B2 | 9/2005 | Sato |
| 6,947,101 B2 | 9/2005 | Arling |
| 7,013,434 B2 | 3/2006 | Masters et al. |
| 7,046,161 B2 | 5/2006 | Hayes |
| 7,154,566 B2 | 12/2006 | Gustafson et al. |
| 7,254,777 B2 | 8/2007 | Hayes et al. |
| 7,375,673 B2 | 5/2008 | Spilo |
| 7,562,128 B1 | 7/2009 | Caris et al. |
| 7,671,758 B1 | 3/2010 | Seidel et al. |
| 7,907,222 B2 | 3/2011 | Haughawout et al. |
| 7,969,514 B2 | 6/2011 | Haughawout et al. |
| 8,525,938 B2 | 9/2013 | Haughawout et al. |
| 8,854,192 B1 | 10/2014 | Harris et al. |
| 8,854,556 B2 | 10/2014 | Haughawout et al. |
| 9,047,761 B2 | 6/2015 | Haughawout et al. |
| 9,123,236 B2 | 9/2015 | Haughawout et al. |
| 9,489,835 B2 | 11/2016 | Haughawout et al. |
| 9,648,358 B2 | 5/2017 | Ellis et al. |
| 9,792,133 B2 | 10/2017 | Lee et al. |
| 9,978,263 B2 | 5/2018 | Haughawout |
| 10,600,317 B2 | 3/2020 | Haughawout et al. |
| 2002/0158771 A1 | 10/2002 | Mears |
| 2003/0141987 A1 | 7/2003 | Hayes |
| 2003/0189509 A1 | 10/2003 | Hayes et al. |
| 2004/0056789 A1 | 3/2004 | Arling et al. |
| 2004/0075602 A1 | 4/2004 | Griesau et al. |
| 2004/0078822 A1 | 4/2004 | Breen et al. |
| 2004/0113892 A1 | 6/2004 | Mears et al. |
| 2004/0207535 A1 | 10/2004 | Stevenson et al. |
| 2004/0235463 A1 | 11/2004 | Patel |
| 2004/0257239 A1 | 12/2004 | Griesau et al. |
| 2005/0068222 A1 | 3/2005 | Krzyzanowski et al. |
| 2005/0097618 A1 | 5/2005 | Arling et al. |
| 2005/0110651 A1 | 5/2005 | Martis et al. |
| 2005/0243057 A1 | 11/2005 | Sugiyama et al. |
| 2005/0273817 A1 | 12/2005 | Rodriguez et al. |
| 2006/0044175 A1 | 3/2006 | Choi |
| 2007/0052547 A1 | 3/2007 | Haughawout et al. |
| 2007/0225828 A1 | 9/2007 | Huang et al. |
| 2008/0155071 A1 | 6/2008 | Lindstrom |
| 2008/0320542 A1 | 12/2008 | Guzman et al. |
| 2009/0079813 A1 | 3/2009 | Hildreth |

FOREIGN PATENT DOCUMENTS

| | | |
|---|---|---|
| WO | WO 00/34851 A1 | 6/2000 |
| WO | WO 00/39772 | 7/2000 |
| WO | WO 01/47130 A1 | 6/2001 |
| WO | 03/044756 A1 | 5/2003 |
| WO | WO 03/044684 A1 | 5/2003 |
| WO | WO 03/83801 A2 | 10/2003 |
| WO | WO 04/51592 A | 6/2004 |
| WO | WO 1489575 A2 | 12/2004 |
| WO | WO 05/036325 A2 | 4/2005 |
| WO | WO 2490195 A2 | 8/2012 |

OTHER PUBLICATIONS

The Int. Bureau of WIPO, International Preliminary Report on Patentability of PCT Application No. US10/61771, dated Jul. 5, 2012, 8 pgs.
Brazilian Patent Office, preliminary office action issued on Brazilian patent application No. BR1120120154028, 2 pages.
Sony Corporation, Digital Network Recorder SVR-2000, Setup Guide, 2000, pp. 1-68
U.S. Patent and Trademark Office, Notice of Allowance issued on U.S. Appl. No. 13/026,768 dated Apr. 17, 2013, 6 pages
European Patent Office, Partial European Search Report issued on EP patent application No. 13162427.2, dated Jan. 22, 2014, 6 pages.
European Patent Office, extended European Search Report issued on EP patent application No. 13162431.4, dated Jan. 16, 2014, 7 pages.
European Patent Office, extended European Search Report issued on EP patent application No. 13162427.2, dated May 15, 2014, 14 pages.
European Patent Office, Office Action issued on EP patent application No. 13162427.2, dated May 4, 2017, 6 pages.
European Patent Office, Office Action issued on EP patent application No. 13162431.4, dated May 10, 2017, 5 pages.
U.S. Patent and Trademark Office, Non-Final Office Action issued on U.S. Appl. No. 15/843,376, dated Jul. 12, 2018, 14 pgs.
U.S. Patent and Trademark Office, Non-Final Office Action issued on U.S. Appl. No. 16/393,348, dated Aug. 8, 2019, 7 pgs.
U.S. Patent and Trademark Office, Non-Final Office Action issued on U.S. Appl. No. 15/843,407, dated Sep. 20, 2018, 16 pgs.
File Wrapper of U.S. Pat. No. 7,969,514, EX1002.
Tinsman Declaration, EX1003.
Tinsman CV, EX1004.
File Wrapper of U.S. Pat. No. 7,907,222, EX1011.
Rosenberg Affidavit, EX1013.

(56) References Cited

OTHER PUBLICATIONS

Schmidt Declaration, EX1023.
File Wrapper of U.S. Appl. No. 10/428,351, EX1024.
EX1025.
Redacted Balakrishnan Report, EX1026.
Order No. 24, EX1027.
Order No. 8, EX1030.
Notice of Institution of Investigation, EX1031.
Order, EX1032.
Email, EX1033.
Tinsman Declaration, EX1034.
Rosenberg Deposition, EX1035.
Sony Digital Network Recorder, Installation Guide, SVR-3000, EX1039.
Business Records Declaration of Sony Electronics Inc., EX1040.
Rosenberg Deposition Transcript Rough, EX1043.
Tinsman Declaration ISO Petitioner's Opposition to RMTA, EX1044.
Email Chain, EX1045.
Rosenberg Deposition Transcript (FINAL), EX1046.
Petitioner's Demonstratives, EX1047.
U.S. Patent and Trademark Office, Final Office Action issued in U.S. Appl. No. 17/524,777, dated Apr. 11,2022, 17 pgs.
U.S. Patent and Trademark Office, Non-Final Office Action issued on U.S. Appl. No. 17/524,777, dated Jan. 25, 2022, 17 pgs.
U.S. Patent and Trademark Office, Non-Final Office Action issued on U.S. Appl. No. 17/524,549, dated Feb. 22, 2022, 24 pgs.
U.S. Patent and Trademark Office, Non-Final Office Action issued in U.S. Appl. No. 17/524,827, dated Mar. 7, 2022, 17 pgs.
U.S. Patent and Trademark Office, Non-Final Office Action issued in U.S. Appl. No. 17/525,113, dated Mar. 18, 2022, 16 pgs.
Declaration of John Tinsman Under 37 C.F.R. § 1.132
"TiVo Installation Guide—Series 2 Digital Video Recorder," archived by web.archive.org on Aug. 12, 2004, with Affidavit of Elizabeth Rosenberg attached ("TiVo").
File History of U.S. Pat. No. 10,600,317 to Haughawout.
Petition for Inter Partes Review of the '317 Patent in IPR2021-00263.
Petition for Inter Partes Review of the '317 Patent in IPR2021-00264.
Initial Determination on Violation of Section 337 and Recommended Determination on Remedy and Bond.
Declaration of Margaret Schmidt in Support of Petition for Inter Partes Review of U.S. Pat. No. 10,600,317.
Z90356 and Z90351 64KWord Television 50 Controller With Expanded OSD Features, by ZiLOG, Inc. ("Zilog").
ITC Markman Order, Inv. No. 337-TA-1200, filed Oct. 1, 2020.
ITC Commission Opinion, Inv. No. 337-TA-1200, issued Dec. 3, 2021.
PCT_US12_62161 Int. Search Opinion, 5 pgs.
PCT_US12_62161 Int. Search Report, 2 pgs.
PCT_US12_60390, 7 pgs.
PCT_US12_60390_ISA, 4 pgs.
PCT_US14_38151_Int. Search Report, 2 pgs.
PCT_US14_38151_Written Opinion of Int. Searching Authority, 7 pgs.
U.S. Patent and Trademark Office, Final Office Action issued in U.S. Appl. No. 17/524,549, dated May 31, 2022, 26 pgs.
U.S. Patent and Trademark Office, Final Office Action issued in U.S. Appl. No. 17/524,827, dated Jun. 22, 2022, 21 pgs.
Direct TV TiVo Installation Guide, Hughes Network Systems, 2000 by TiVo Inc., Published in the U.S.A., relevant pages are 2-63.
Wilbert O. Galitz, The Essential Guide to User Interface Design, Second Edition, An Introduction to GUI Design Principles and Techniques, Publisher: Robert Ipsen, Whiley Computer Publishing, John Wiley & Sons, Inc., 2002, relevant pages entire document.
Ebu-Uer, Digital Video Broadcasting, ETSI TS 102 006 v1.3.1, (May 2004), Technical Specification, Digital Video Broadcasting (DVB); Specification for System Software Update in DVB Systems, European Broadcasting Union, www.etsi.org, relevant pp. 1-39.
Hitachi, Ltd., et al. High-Definition Multimedia Interface, Specification Version 1.3a, Nov. 10, 2006, 2001-2006, relevant pages entire document.
Norme Internationale Internaional Standard, CEI IEC 61883-1, First edition, Feb. 1998, Consumer audio/video equipment-Digital interface-Part 1:General, Copyright International Electrotechnical Commission, Ref. No. CEI/IEC 61883-1:1998, Order No. W2248667, relevant pages entire document.
The State Intellectual Property Office of People's Republic of China, Second Office Action issued in Appl. No. 201480057944.0, Examiner Code: 496744, 14 pgs.
Infrared Data Association Serial Infrared Physical Layer Specification, Version 1.4, May 30, 2001 (Feb. 6, 2001), Copyright 1994, Infrared Data Association, relevant pp. 1-60.
Logitech, Logitech Unveils Harmony 680 Remote: Maestro of the Living Room Media Center PC, Logitech NASDAQ:LOGI, Oct. 12, 2004; Fremont, CA; relevant pages entire document.
Angus Huang, PocketRemote: Integrating a Universal Remote Control with a Handheld Computer, Submitted to the Department of Electrical Engineering and Computer Science, Feb. 1, 2002, 2002 Angus Huang, relevant pages entire document.
Sony, 2001 Home Network Roducts, SVR-2000 Digital Network Recorder, 2001 Sony Electronics Inc., relevant pages entire document.
Sony, 3-060-082-01 (1), Digital Network Recorder SVR-2000, Setup Guide, 2000 by Sony Corporation, Sunnyvale, CA, 94089, http://www.tivo.com, relevant pages entire document.
Sony, Digital Network Recorder, Installation Guide, SVR-3000, 2002 by Sony Electronics Inc, relevant pages entire document.
TiVo / Philips, Personal TV Owner's Guide, 999 by TiVo, Inc., USA, relevant pages entire document.
Philips, Directv, TiVo, DIRECTV Receiver with TiVo Viewer's Guide, relevant pages entire document.
TiVo, Digital Video Recorderwith TiVo, Spring and Fall 2001, Service Update Guide, relevant pages entire document.
RCA, Tivo Viewer's Guide, 1999, 2000 by TiVo, Inc., Published in the U.S.A., relevant pages entire document.
U.S. Patent and Trademark Office, Non-Final Office Action issued in Appl. No. 17/512,261, dated Sep. 13, 2022, 9 pgs.
U.S. Patent and Trademark Office, Non-Final Office Action issued in Appl. No. 17/524,549, dated Dec. 9, 2022, 34 pgs.

* cited by examiner

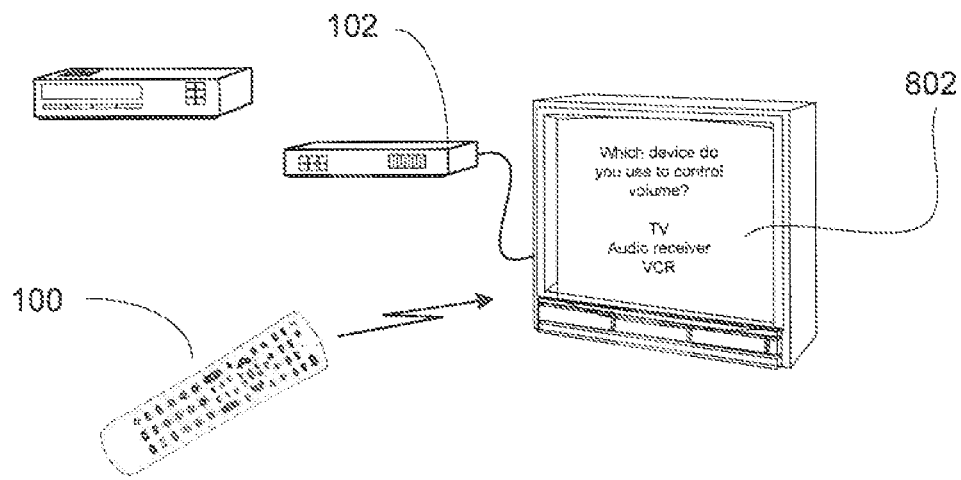
Fig 8a
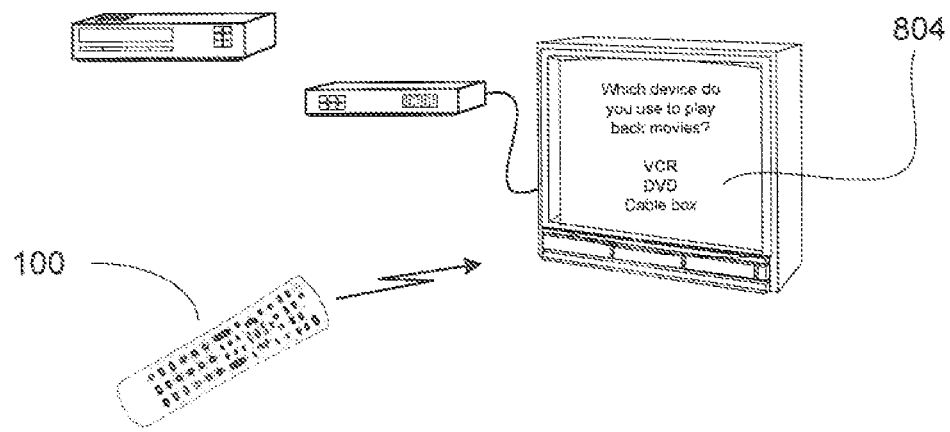
Fig 8b
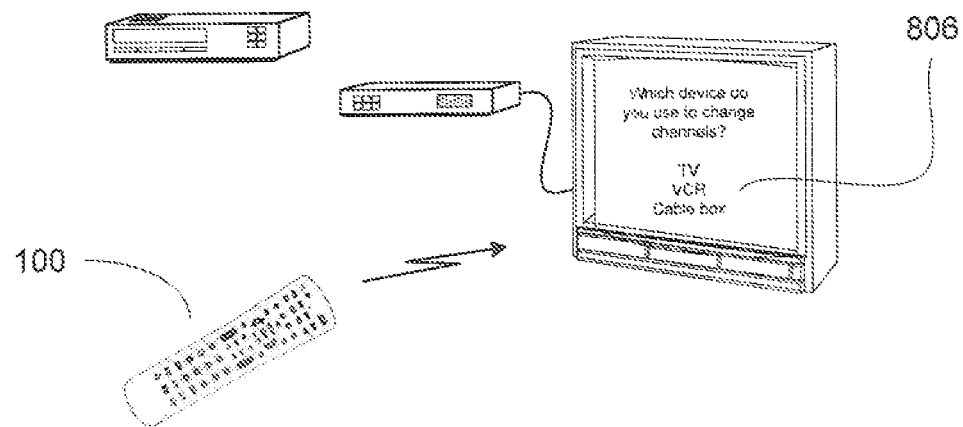
Fig 8c
FIGURE 8

SYSTEM AND METHOD FOR WIDGET-ASSISTED SETUP OF A UNIVERSAL REMOTE CONTROL

RELATED APPLICATION DATA

This application claims the benefit of and is a continuation of U.S. application Ser. No. 15/785,509, filed on Oct. 17, 2017, which application claims the benefit of and is a continuation of U.S. application Ser. No. 12/974,231, filed on Dec. 21, 2010, which application claims the benefit of U.S. Provisional Application Ser. No. 61/289,486, filed on Dec. 23, 2009, and claims the benefit of and is a continuation-in-part of U.S. application Ser. No. 11/515,962, filed on Sep. 5, 2006, which application in turn claims the benefit of U.S. Provisional Application Ser. No. 60/715,229 filed on Sep. 8, 2005, which applications are incorporated herein by reference in their entirety.

BACKGROUND OF THE INVENTION

This invention relates generally to remote control systems and, more particularly, to a system and method for setting up and configuring a universal remote control to command functions of one or more types of remotely controllable appliances of one or more manufacturers. Exemplary types of appliances include, but are not limited to televisions, video cassette recorders (VCRs), cable boxes, disk players, digital video recorders (DVRs), thermostats, game consoles, etc.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. By way of example, universal remote controls are described in commonly assigned U.S. Pat. Nos. 4,959,810, 5,255,313 and 5,552,917.

In a common method of setting up a universal remote control, codes for commanding functions of an appliance are learned from a remote control supplied by the manufacturer with that appliance. The learned codes, which are stored within the universal remote control, are then available for subsequent transmission to the appliance. Alternatively, codes for commanding functions of appliances of various types and various manufacturers can be preprogrammed into the universal remote control. The user then interacts with the universal remote control to identify to the universal remote control which appliance(s) the user desires to command, i.e., the user manually enters an appliance or brand code, usually obtained from a tabulation in a printed user manual or the like, into the universal remote control and the universal remote control uses that user provided identity information to access those preprogrammed codes that are appropriate for commanding the identified appliance(s). In this regard, examples of known methods for performing an initial setup of an universal remote control may be found in, for example, the above mentioned U.S. Pat. No. 4,959,810 as well as U.S. Pat. No. 5,614,906, entitled "Method for Selecting a Remote Control Command Set," or U.S. Pat. No. 4,703,359 entitled "Universal Remote Control Unit with Model Identification Capability," each of which is incorporated herein by reference in its entirety.

An additional system and method for setting up a universal remote control is disclosed in U.S. Pat. No. 6,650,248.

While such known setup methods do work for their intended purpose, it has been seen that the process of setting up and configuring a universal remote control can be demanding, exacting, and generally frustrating for many users. For example, user manuals or other documents containing setup codes and entry instructions may be lost or misplaced, or may be superseded as brand and/or model names evolve, etc. Accordingly, a need exists for a simplified and more user friendly system and method for setting up and configuring a universal remote control.

SUMMARY OF THE INVENTION

In accordance with this need, the following describes a system and method for allowing a universal remote control to be easily setup and configured to command appliances of various types and various manufacturers. In certain exemplary embodiments presented herein, such set up and configuration methods may be facilitated via the use of a networked appliance, for example a cable or satellite set top box, an Internet-enabled TV, etc., as an intermediary. For example, such a system and method for enabling set up of a controlling device capable of controlling a plurality of appliances may provide an interactive instruction set and associated programming, i.e., a widget, which is downloadable to a controllable appliance having an associated display, such as an Internet enabled television. The programming is accessible by the controllable appliance and is configured to appropriately display interactive instructions from the interactive instruction set to a user during a user initiated set up procedure for setting up the controlling device to communicate commands to another controllable device (e.g., a DVD, VCR, DVR, etc).

A better appreciation of the objects, advantages, features, properties, and relationships of the system and method for setting up and configuring a universal remote control will be obtained from the following detailed description and accompanying drawings which set forth illustrative embodiments which are indicative of the various ways in which the principles of the system and method may be employed.

BRIEF DESCRIPTION OF THE DRAWINGS

For use in better understanding the exemplary systems and methods for setting up a universal remote control which are described hereinafter, reference may be had to preferred embodiments shown in the following drawings in which:

FIG. 8 illustrates the system of FIG. 1 at various stages during an exemplary key mapping setup of the exemplary remote control;

DESCRIPTION OF THE INVENTION

Figure 1:
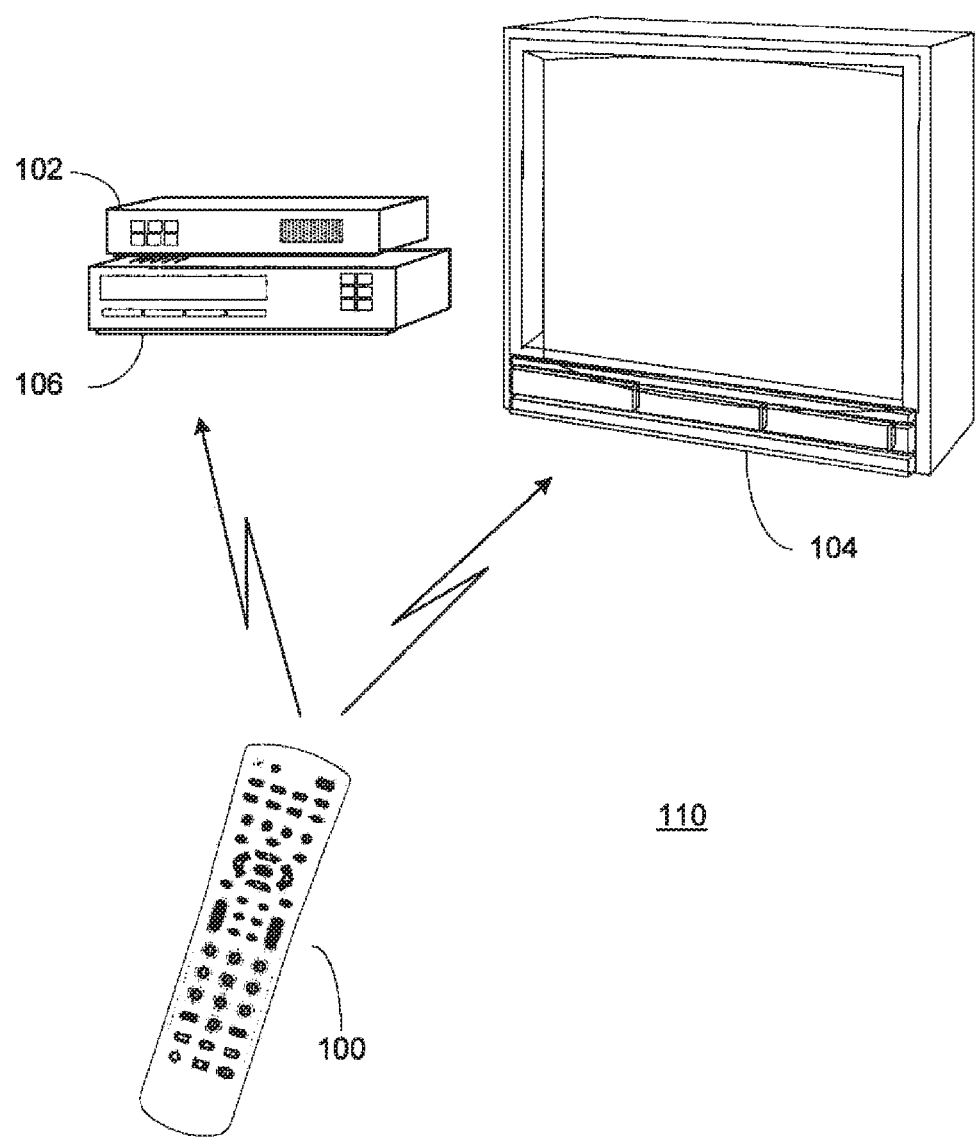
FIG. 1 illustrates an exemplary system in which a universal remote control may be used.

The following describes a system and methods for setting up and configuring a universal remote control to command one or more functions of one or more types of appliances of one or more manufacturers. By way of example, FIG. 1 illustrates an exemplary system 110 wherein a universal remote control 100 supplied together with a cable set top box 102 may be used to command functions of various appliances, illustrated as a TV set 104 and a VCR 106.

Figure 2:
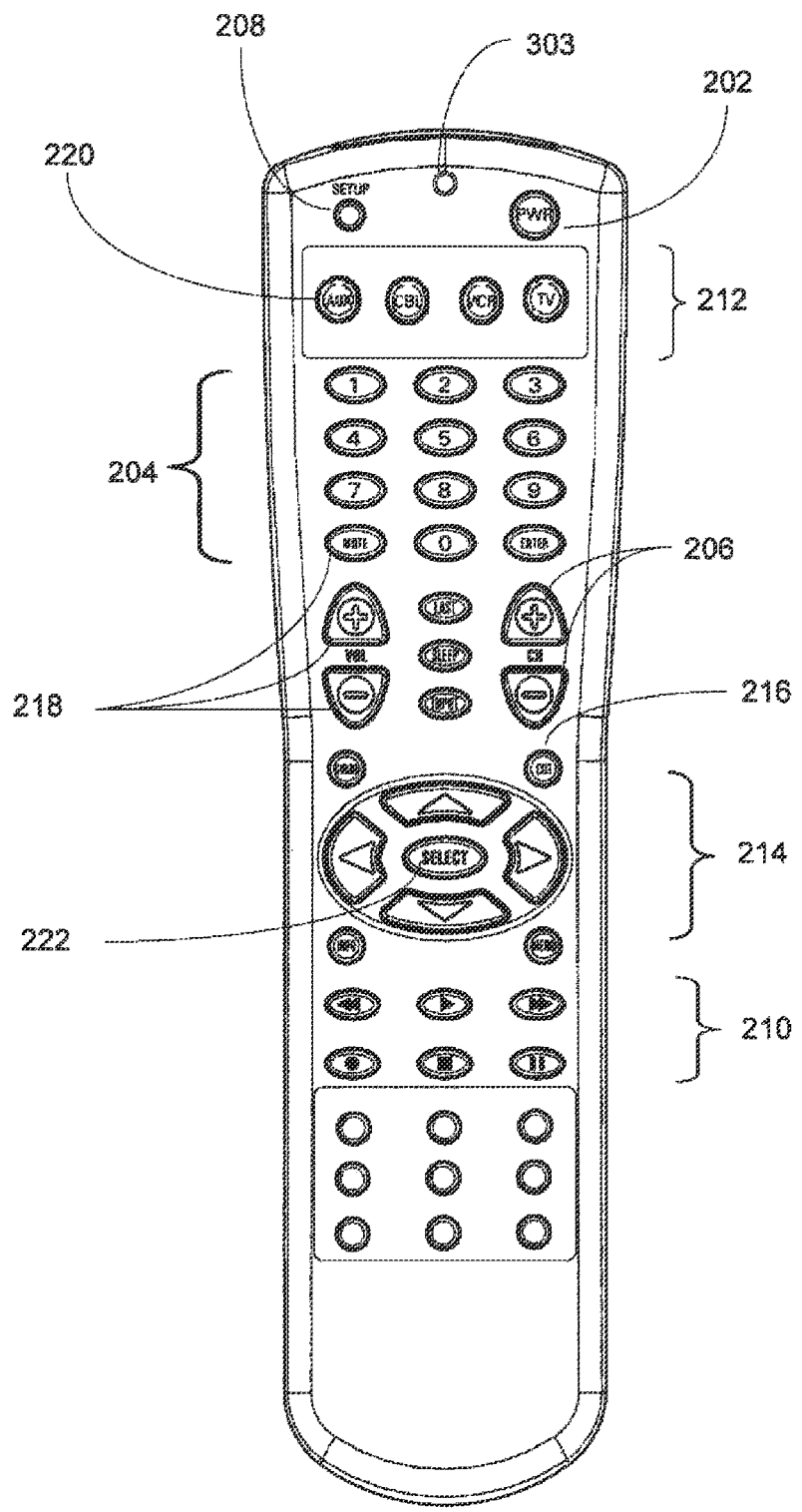
FIG. 2 illustrates a top view of an exemplary universal remote control for use in the system of FIG. 1.

For use in remotely commanding a device to perform a common and/or extended operational function (i.e., a function that may not be widely supported by devices of a common device type), the universal remote control 100, an example of which is illustrated in FIG. 2, includes a set of command keys within a key matrix which are assigned to operational functions. In this regard, common operational functions include functions that are usually widely supported by devices of a common device type (e.g., power 202, digit tuning 204, volume control 218, channel up/down control 206, media transport 210, etc.) The universal remote control 100 also includes device keys 212, e.g., "AUX," "CBL," "VCR," and "TV," the activation of which places the universal remote control 100 into a mode to transmit commands to a particular type of device, and a setup key 208. It will be appreciated that, while illustrated as hard keys, in other embodiments some or all of the keys of the universal remote control 100 may implemented as soft keys, for example, by being displayed on an LCD touch screen or the like.

Figure 3:
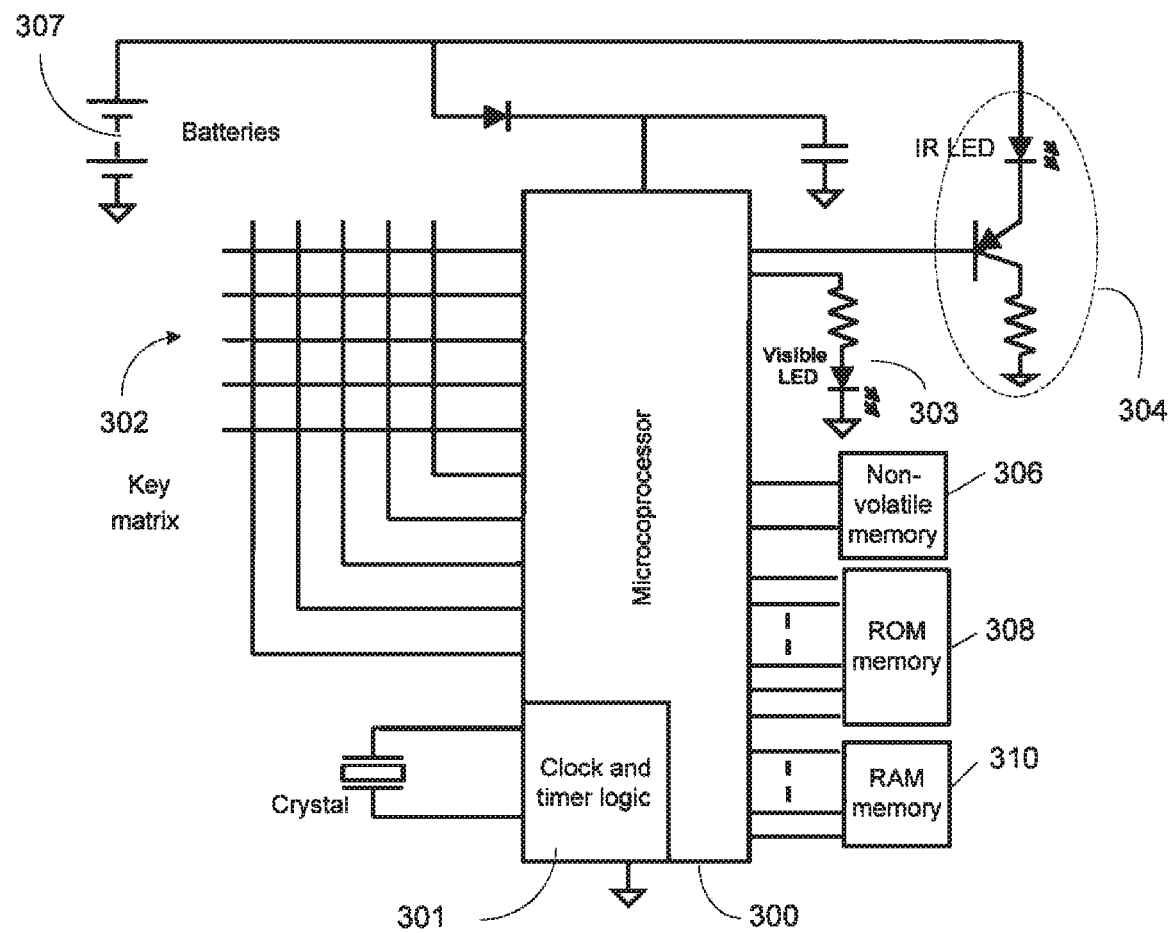
FIG. 3 illustrates a block diagram view of various components of the exemplary universal remote control of FIG. 2.

By way of further example, referring to FIG. 3, the universal remote control 100 may include, as needed for a particular application, a processor 300 coupled to one or more memory devices (such as a ROM memory 308, a RAM memory 310, and/or non-volatile read/write memory 306), a key matrix 302 (e.g., physical buttons, a touch screen display, or a combination thereof), an internal clock and timer 301, transmission circuit(s) 304 (e.g., IR and/or RF), receiver circuit(s) and/or transceiver circuit(s) (e.g., IR and/or RF—not illustrated), a means 303 to provide visual feedback to the consumer (e.g, LED, display, and/or the like), means to provide audio feedback to the user (e.g., a speaker—not illustrated), a power supply 307, and/or a serial I/O port (e.g., a jack or contacts—not illustrated). As will be understood by those of skill in the art, the memory device(s) includes executable instructions that are intended to be executed by the processor 300 to control the operation of the universal remote control 100. In this manner, the processor 100 may be programmed to control the various electronic components within the universal remote control 100, e.g., to monitor the power supply 307, to cause the transmission of signals, display icons and/or HTML pages, etc. The non-volatile read/write memory 306, for example, an EEPROM or the like, may be provided to store setup data and parameters as necessary such that data is not required to be reloaded after battery changes. It is to be understood that the memory devices may take the form of any type of readable media, such as, for example, a Smart Card, memory stick, a chip, a hard disk, a magnetic disk, and/or an optical disk. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the universal remote control 100 to perform an action, the universal remote control 100 is adapted to be responsive to events, such as a sensed consumer interaction with the key matrix 302, receipt of a transmission, etc. In response to an event appropriate instructions and/or data within the memory devices are executed and/or accessed. For example, when a command key is activated on the universal remote control 100, the universal remote control 100 may retrieve a code data value corresponding to the activated command key from a memory device and access instructions to transmit the retrieved code data value to a device in a format recognizable by the device. It will be appreciated that the instructions within the memory devices can be used not only to cause the transmission of command codes and/or data to the devices but also to perform local operations. While not limiting, local operations that may be performed by the universal remote control 100 include displaying information/data, favorite channel setup, macro button setup, command function key relocation, etc. Since examples of local operations can be found in U.S. Pat. Nos. 5,481,256, 5,959,751, and 6,014,092 they will not be discussed in greater detail herein.

To initially program the universal remote control 100 to access the operational functions of a device, the consumer may use an improved system and method for obtaining, entering, and testing device code information, one exemplary embodiment of which is described hereafter.

Figure 4:
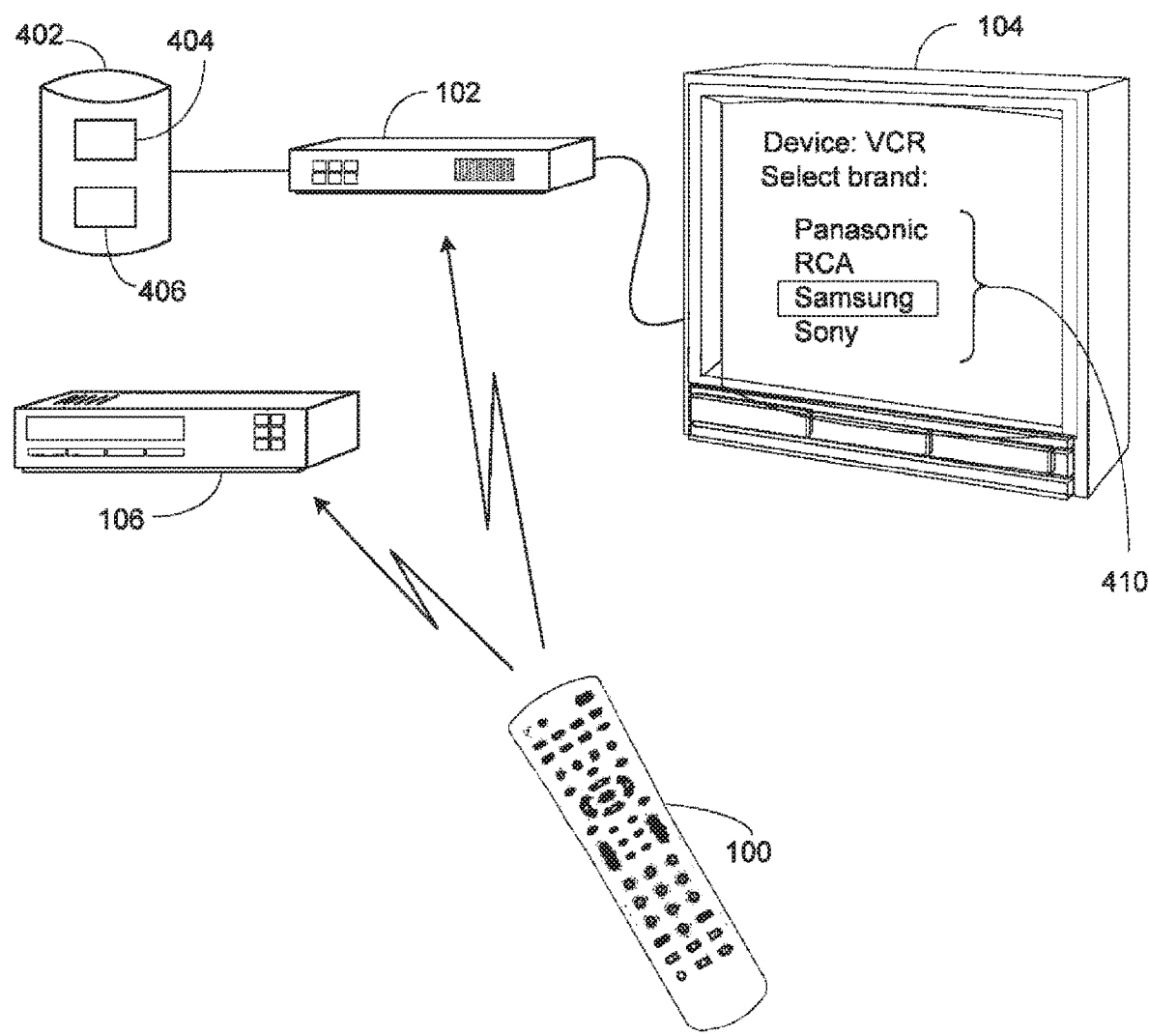
FIGS. 4 through 6 illustrate the system of FIG. 1 at various stages during initial setup of the exemplary universal remote control.

Turning now to FIG. 4, in an exemplary embodiment a remote control 100 may be supplied together with a cable or satellite set top box ("STB") 102. Remote control 100 may include a universal library of infrared codes for use in controlling other types of appliances which are commonly utilized in conjunction with a set top box, such as for example a TV 104 and/or a VCR 106. To facilitate setting up remote control 100 to command operation of appliances 104, 106, STB 102 may be equipped with data 404 and application program 406, preferably stored locally within STB 102 on mass storage 402 or on a device otherwise accessible to STB 102. It will be appreciated that mass storage 402 may take the form of flash memory, ROM memory, RAM memory, memory card or stick, hard disk drive, CD ROM, etc., or any combination of the above as appropriate. It will be further appreciated that data 404 and application 402 may be periodically updated over the cable network and/or may in certain embodiments even be partially or fully resident at the cable headend or other remote source accessible by STB 102. The data 404 and application 402 may also be updated using a device other than the STB 102. For example, if the data 404 and application 402 are maintained on removable memory, the removable memory may be updated via a personal computer or other device with an Internet connection and then replaced into the STB 102. It should also be appreciated that while the exemplary embodiment below is presented in terms of interactions between a remote control 100 and an application 402 resident in an STB, in alternative embodiments application 402 may be hosted on, and the interactions may occur with, any suitable appliance such as a TV, DVR, AV receiver, etc. without limitation.

Figure 7:
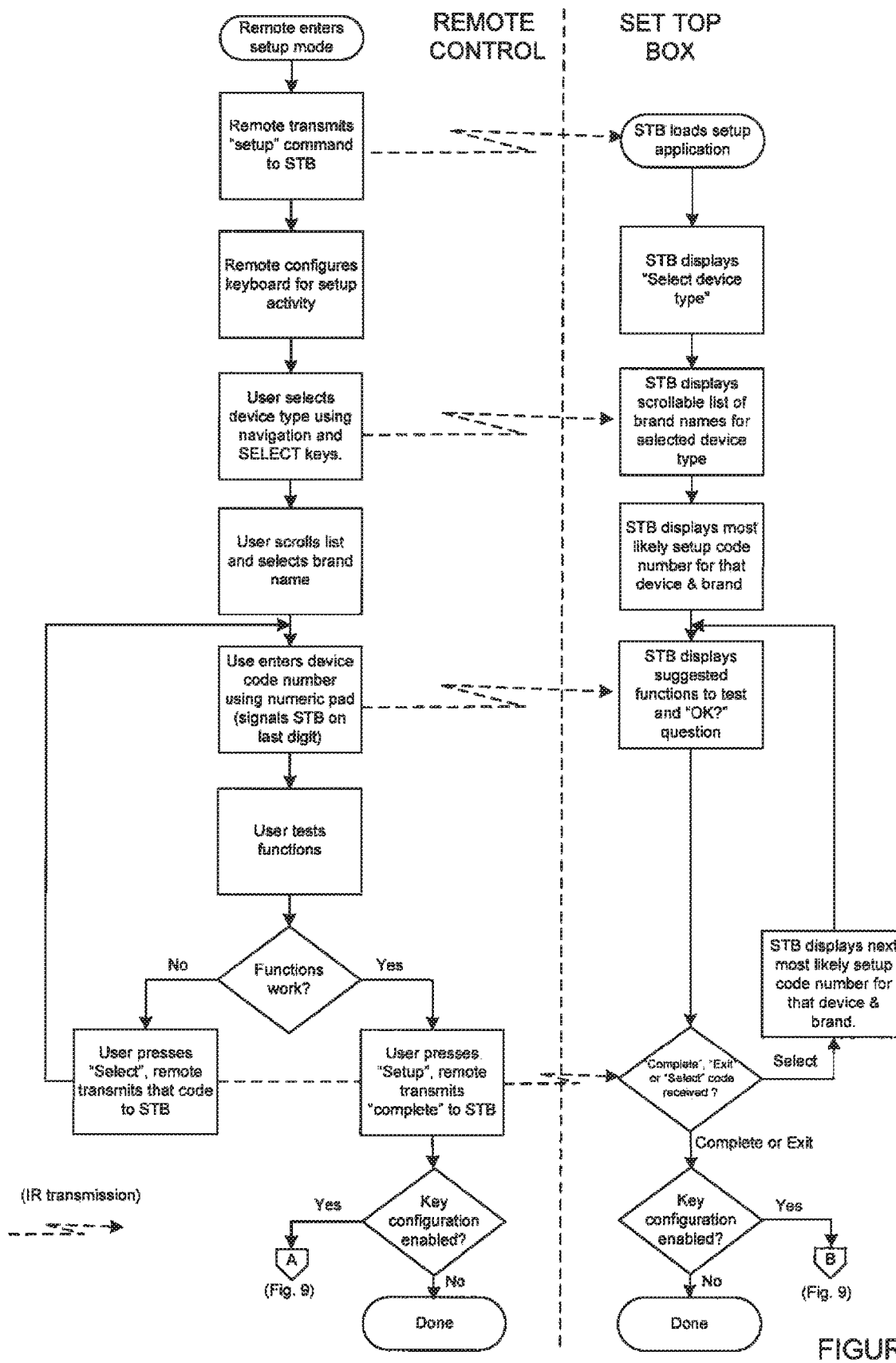
FIG. 7 illustrates, in flow chart form, the steps performed during initial setup of the exemplary universal remote control.

Application 406 is responsive to IR signals issued by remote control 100 during the user setup process as illustrated in the flowchart of FIG. 7 and described below:

The user enters a Setup Mode by, for example, pressing and holding setup key 208. The entering of the Setup Mode may be signaled to a user by the LED 303 blinking twice (e.g., upon pressing and holding the setup key for approximately 3 seconds). Upon entering Setup Mode the remote control transmits a specific "setup" IR code to STB 102 which is interpreted as a command to initiate the "Remote Setup/Help" application 406. Alternatively or as a backup, in certain embodiments application 406 may also be invoked from STB 102's built-in menu system, upon activation of a dedicated key on the STB 102, etc.

In connection with entering the setup mode, the remote control 100 may configure its keyboard as follows:

Navigation (Left, Right, Up, Down and Select/OK keys) 214, Exit key 216, and device keys 212 are adapted to cause transmission of infrared command data in the format recognized by STB 102;

Digit entry keys 204 do not transmit commands but serve only for input of appliance setup codes as described hereafter; and Function keys such as volume 208, channel up/down 206, transport keys 210, etc. are adapted to cause transmission of infrared command data in the format of the appliance under test as described hereafter.

Figure 5:
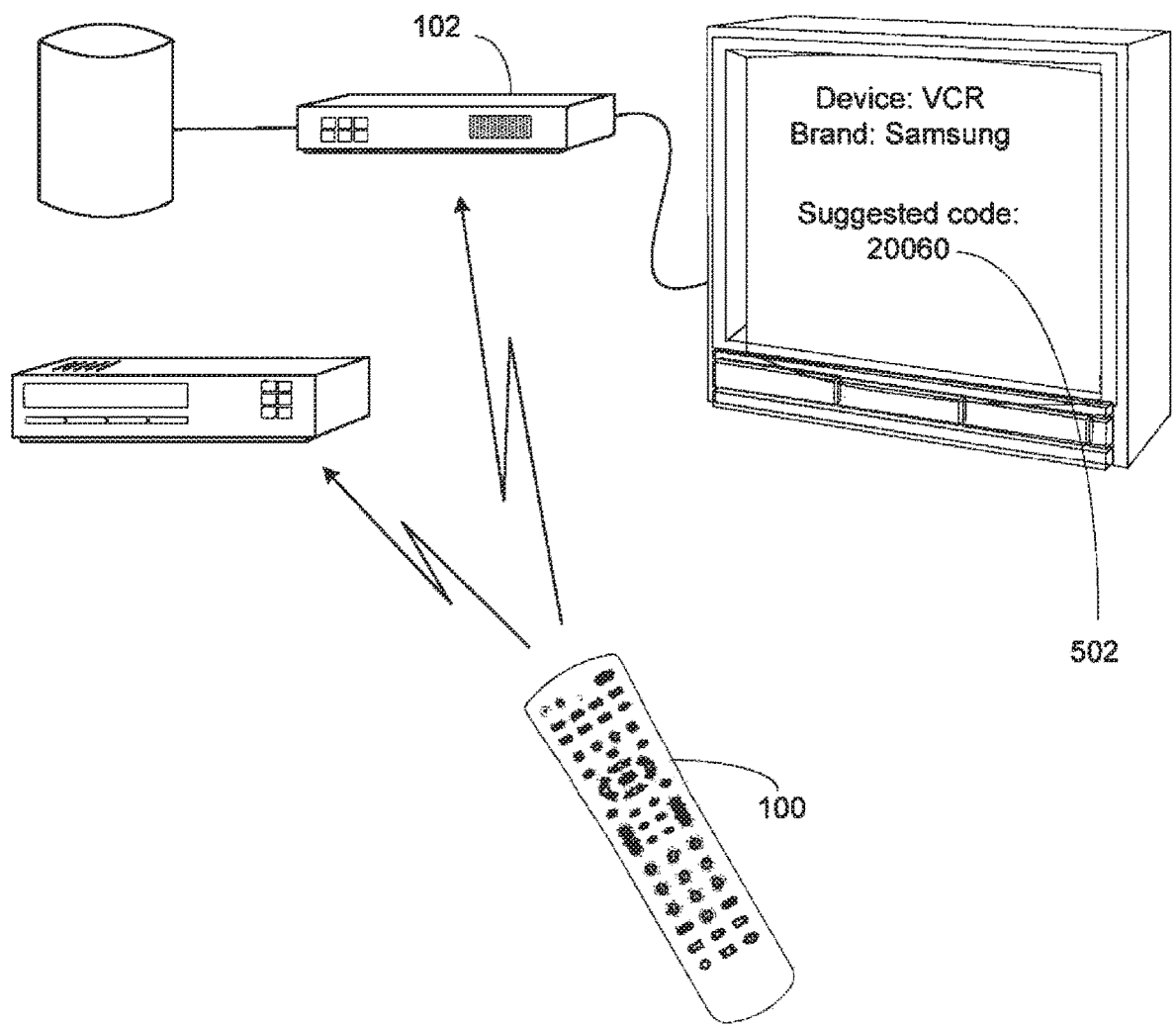

In connection with the following paragraphs, the reader may wish to refer to FIG. 7 which presents, in flowchart form, a summary of the steps described below and illustrated in FIGS. 4 through 6. Upon initiation, STB application 406 may display on TV 104 a user prompt such as for example: "What device do you want to setup for control?" together with a list of valid device types, e.g. "TV", "VCR", "Receiver", etc. The application 406 may also prompt the user to select an appropriate language for the prompts. Application 406 may additionally display messages for general user guidance such as for example "Press Exit at any time to exit remote setup and return to watching TV."

In the exemplary embodiment the user may then select, using navigation keys 214, a desired device type from the displayed list, for example "VCR." In an alternative embodiment, the user may directly select the device type by actuating one of the device keys 212 of the remote control, which may in that instance be adapted to transmit a signal to the STB indicative of the device type selected. Application 406 may respond by displaying a confirmation of the selected device type together with scrollable list 410 of valid brand names for that device type, as illustrated in FIG. 4. The brand names that comprise this list are obtained by reference to data file 404. In this way it will be understood that certain keys or groups of keys on remote control 100 may be temporarily reconfigured (generally during the setup procedure) to transmit command data to STB for purposes of user interaction with application 406 during the setup process.

The user may then select (once again via use of keys 214) a desired brand name, for example "Samsung." Application 406 may respond by displaying the remote control setup code number most likely to result in selection of an infrared code set which will operate appliances of the type and manufacture indicated (once again, obtained by reference to data 404). In the exemplary embodiment presented, this number may include a leading digit to indicate to the remote control programming which device type is to be setup, e.g. "2" for "VCR". In alternative embodiments where the user may already have explicitly entered the device type being set up via one of the keys 212, this may not be necessary.

The user may then enter this number, for example "2" "0" "0" "6" "0" (502 in FIG. 5), into remote control 100 using digit entry keys 204. Upon entry of the final digit of the sequence, remote control 100:

Configures itself to transmit commands in the indicated infrared command format in response to actuation of function keys 206, 208, 210, etc., and Transmits an infrared command in STB format to notify the STB application 406 that device code entry is complete.

Figure 6:
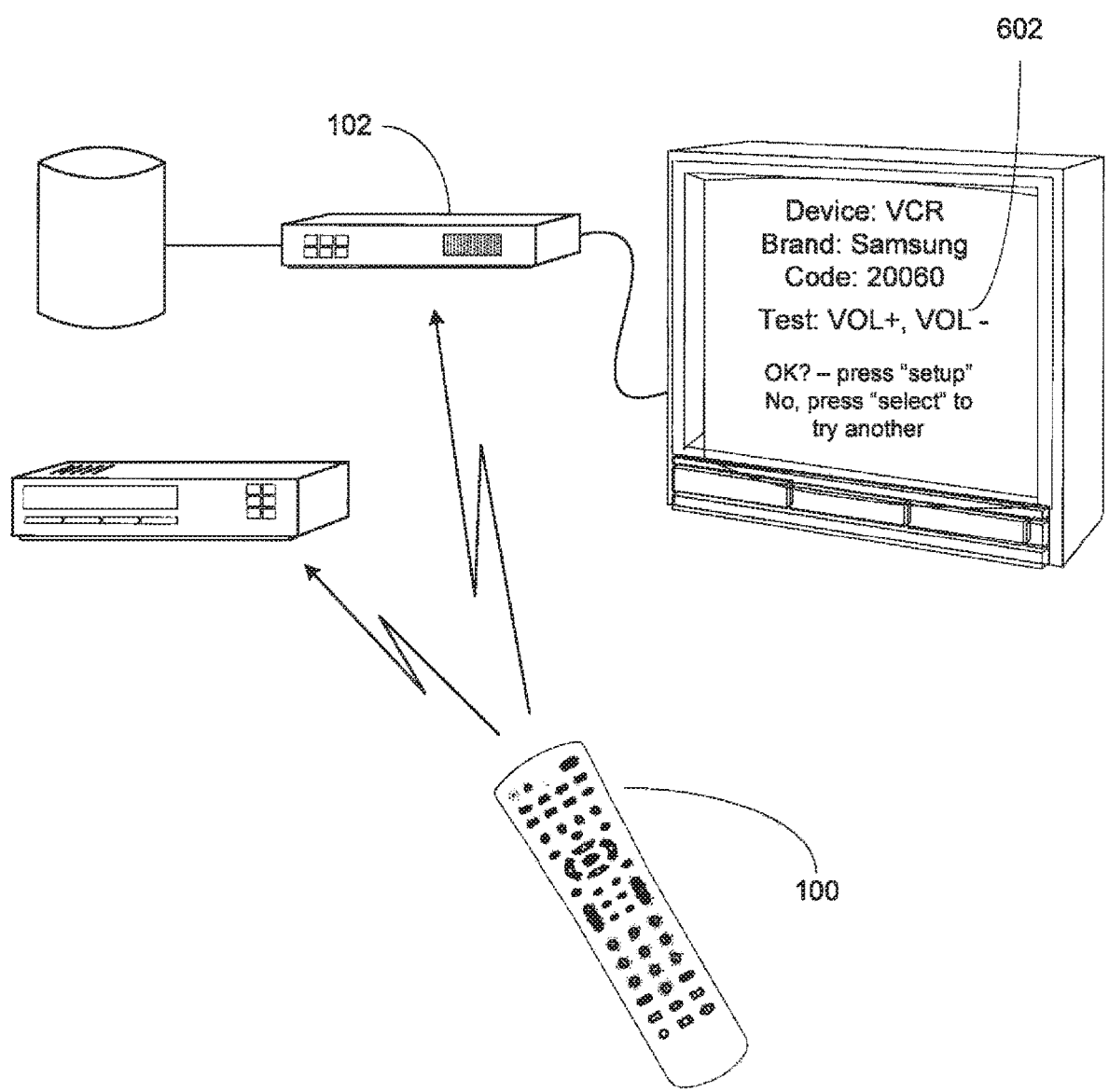

Upon receipt of the completion signal from remote control 100, STB application 406 may display a listing of suggested function(s) 602 to test operation of the target appliance using the code just entered, together with a user message to, for example, press "setup" if the suggested code works, or to press "select" to try a different code, all as illustrated in FIG. 6.

If the user activates the "setup" key, indicative that the current code being tested has been found suitable to command operation of the appliance, remote control 100 again transmits a completion signal in STB infrared format, which is interpreted by application 406 in STB 102 as a successful conclusion of the setup process and causes application 406 to terminate execution, returning STB 100 to normal operation. Likewise, remote control 100 also returns to normal operation, configured now to issue commands in the chosen format that device type (VCR in the example presented) is selected by activation of one of keys 212.

If on the other hand, the user activates the "select" key, indicative that the current code being tested is unable to command operation of the appliance, remote control 100 transmits the "select" command signal in STB infrared format, which causes application 406 to retrieve and display the next most likely setup code number contained in data 404, so that the user may repeat the test steps using this new code. This setup process may continue until the user finally exits by activating the "setup" or "exit" key, or alternatively, data 404 may include an indicator that no further possibilities exist, upon eventual retrieval of which application 406 may cause a display of instructions to the user to abort the setup process by pressing the "exit" key and, for example, call a customer service number.

In an alternate embodiment, application 406 may be configured to monitor command data transmitted from remote control 100 during the setup process for use in automatically progressing through the various setup instructions and prompts associated with the setup application. By way of example only, application 406 may be configured to monitor command data transmitted from remote control 100 in order to echo key presses on the TV screen as a means of visual verification to the user that a setup code was entered correctly, or to present prompts such as "Did your DVD player respond to the Power On command? Press "1" for yes, or press "0" for no" whereupon receipt of either the "1" or "0" key command data will cause application 406 to proceed automatically to another instruction or prompt in the setup procedure.

In certain embodiments, after the appropriate command code sets for the devices to be controlled have been selected as described above, it may be desirable to further configure certain operational characteristics of remote control 100. In particular, as described for example in U.S. Pat. No. 6,947, 101 or 7,013,434 (both of like assignee and incorporated herein by reference in their entirety) it may be advantageous to assign certain subsets of the keys of remote control 100 to always transmit command codes corresponding to a specific device. As appropriate for a particular embodiment, this may take the form of a fixed assignment of certain keys to always send the same code regardless of the device currently selected via device keys 212 (as described in the aforementioned U.S. Pat. No. 6,947,101) or this may take the form of a separate special page or device mode (e.g. "Home Theater mode") comprised of a composite of groups of key functions from other device modes (as described in the aforementioned U.S. Pat. No. 7,013,434), or some combination thereof. For example, users whose equipment is configured to route all audio signals through their a/v receiver may wish to have the volume keys 208 of exemplary remote control 100 always transmit commands that are intended to control corresponding operations of the receiver (i.e., the device code setup on the AUX mode key 220). Cable or satellite subscribers may wish to have the channel tuning keys 206 and numeric pad 204 always transmit commands that are intended to control corresponding operations of the STB (it will be appreciated that remote controls which are supplied together with a STB may already be factory pre-configured in this manner, however remote controls offered as aftermarket accessories and/or supplied together with other appliances may not be)

Figure 9:
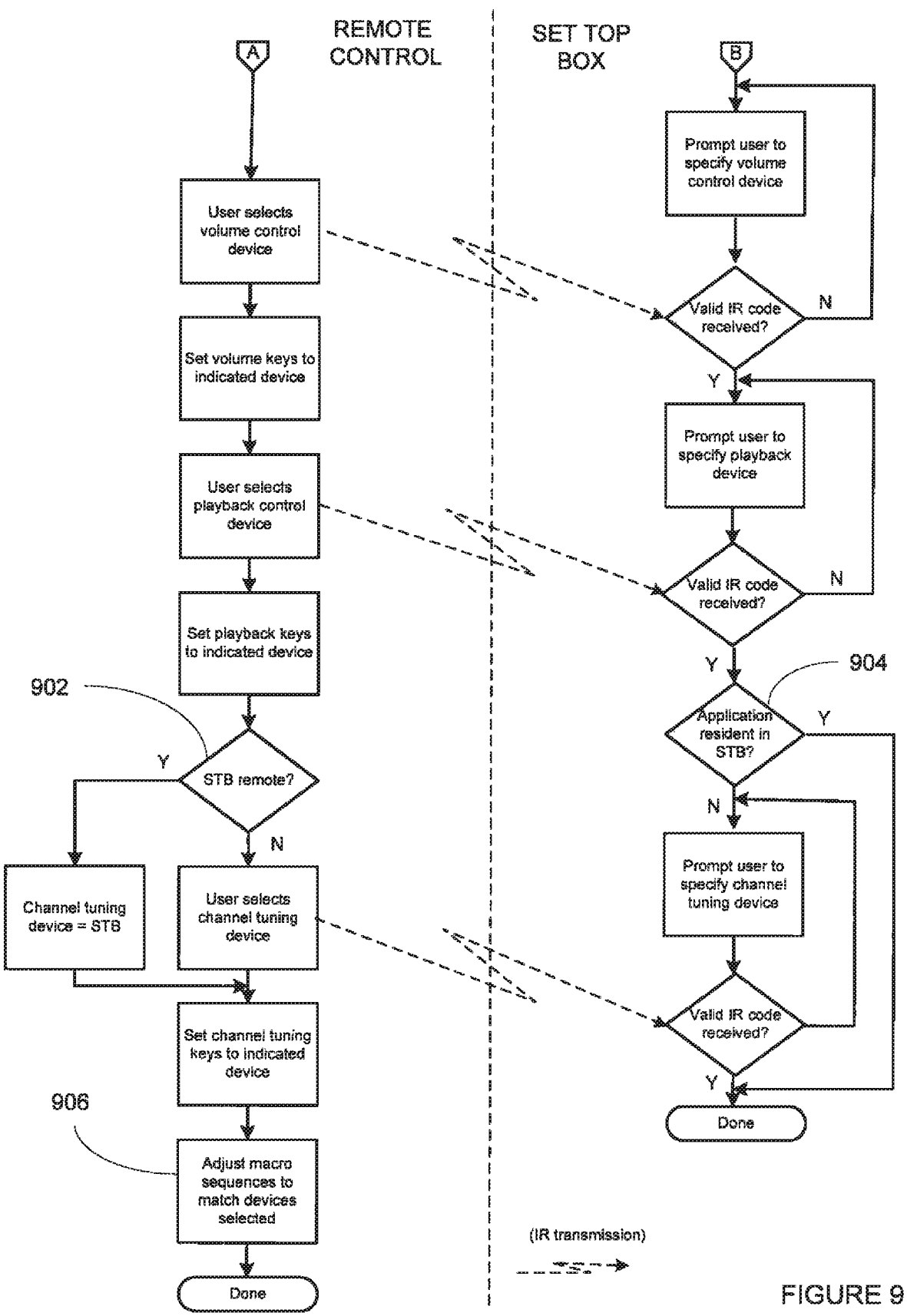
FIG. 9 illustrates, in flow chart form, the steps performed during key mapping setup of the exemplary remote control.

To this end, upon completion of device setup, application 406 may interactively prompt the user to enter information regarding device usage and system configuration, which information may then be used to configure key assignments, automatically program macro command sequences such as "all on", "all off", "watch a movie", etc., or for any other appropriate remote control configuration purpose. An exemplary method for performing key mapping is illustrated in FIG. 8 and summarized in flowchart form in FIG. 9. By way of this example, upon initiation of this particular setup operation, which may be initiated in a manner similar to that described above, application 406 may display on TV 104 a message 802 requesting that the user indicate to the remote control which device is normally used for controlling system volume. In the example presented, the choices 803 are TV, audio receiver, or VCR. Without limitation, this list may include all device types supporting the operation for which is setup is desired, be limited to those device types that the system has learned, through the initial configuration process, are to be controlled via the remote control, etc. The user may then indicate to the remote control which of the listed devices is to be used for this operation by activation of an appropriate one of the device keys 212 ("TV", "Aux" or "VCR" in this instance). Activation of a device key may then cause the remote control 100 to set it's internal key mapping for volume control (i.e., the command codes which are to be transmitted by the volume and mute keys 208 during normal operation) to match the device indicated. Remote control 100 may also transmit a specific command code to STB 102 indicating that a volume selection has been made. Receipt of this command by the STB may cause application 406 to display the next user prompt 804 on TV 104, requesting user selection of the device usually used for movie playback. In a similar manner, a user selection of playback device may be performed. With reference to the flowchart of FIG. 9 (902, 904), in systems where remote control 100 was supplied in conjunction with STB 102 and application 406 is resident in the STB, the step of selecting a channel tuning device may be bypassed since in this instance it is the STB by default. In other situations, the user may be prompted 806 to specify a device to be used for channel tuning, once again in a similar manner to that previously described. Upon completion of this stage of the setup process, in certain embodiments remote control 100 may also adjust 906 macro command sequences (such as "all on" or "all off", or activity initiating macros such as "watch a movie") as required by the newly-entered device preferences.

It will be appreciated that all or part of data 404 and/or application 406 may be downloaded into STB 102 (or other application host device as appropriate) from a cable or satellite headend, the internet, the PSTN, etc., as is well known in the art, either as a periodic update or on demand when the remote control setup feature is invoked. In this manner, the data used to guide the user through the setup process may be refreshed whenever new or revised brand names or cross references occur, to allow for language expansion, etc. Further, in situations where multiple remote control models or revisions have been offered by a supplier of the STB or other host device, alternative data sets 404 may be downloaded, for example based on user response to an initial screen displaying images of the various remote control versions, on an identifying signal transmitted by the remote control to be configured, etc.

Figure 10:
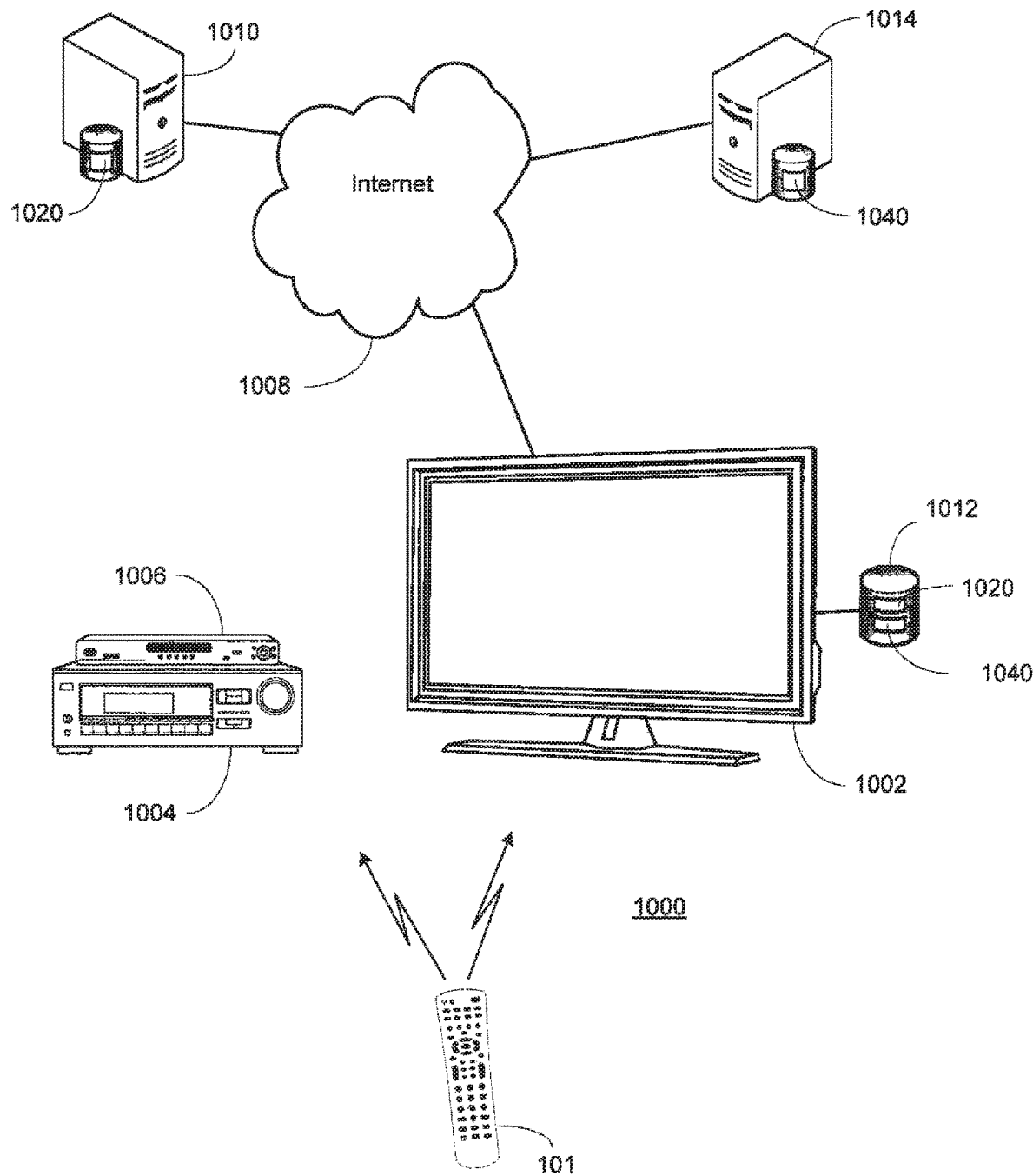
FIG. 10 illustrates a second exemplary system in which a universal remote control may be used.
Figure 11A:
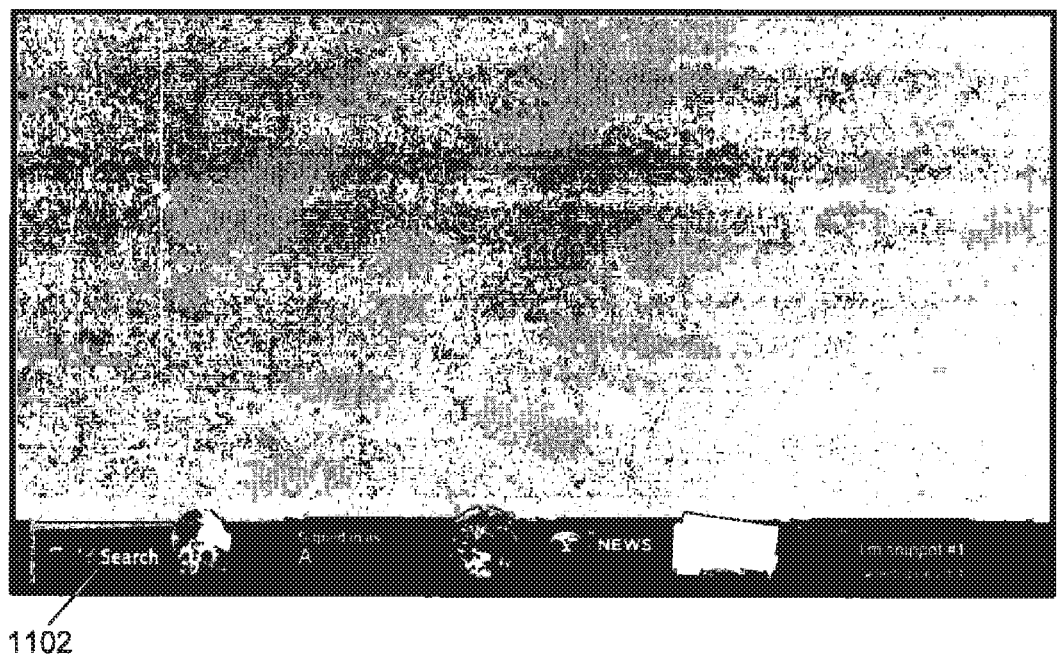
FIGS. 11a through 11d illustrate exemplary screen displays of an Internet-enabled TV when used in connection with setting up the universal remote control of FIG. 10.
Figure 11A:
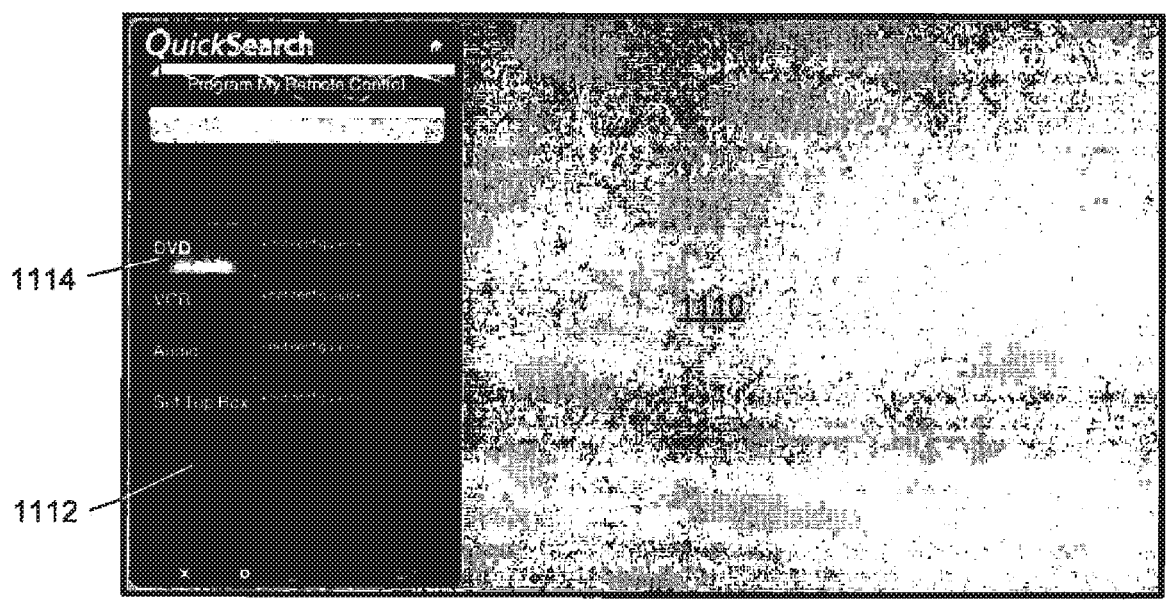
Figure 11B:
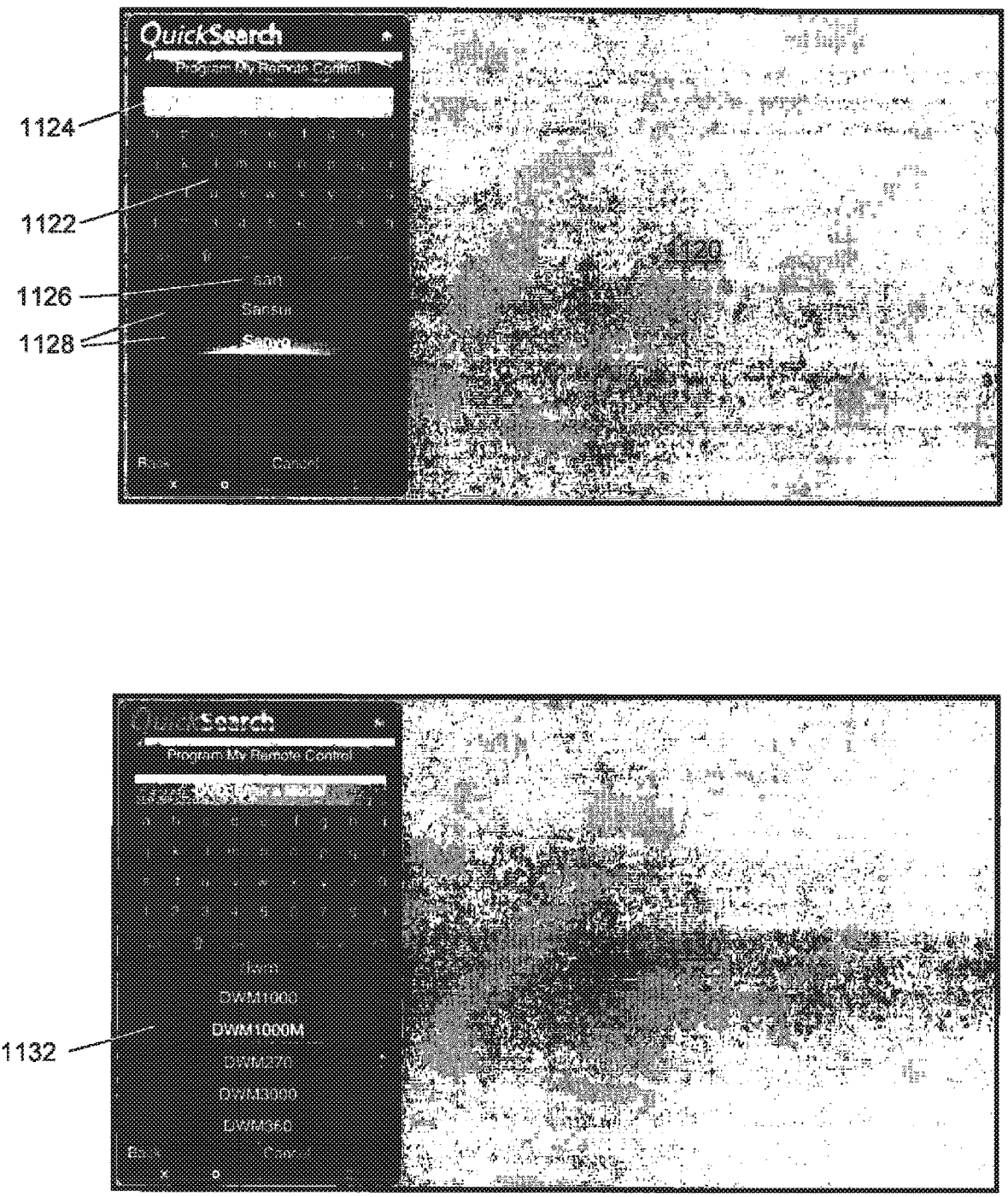
Figure 11C:
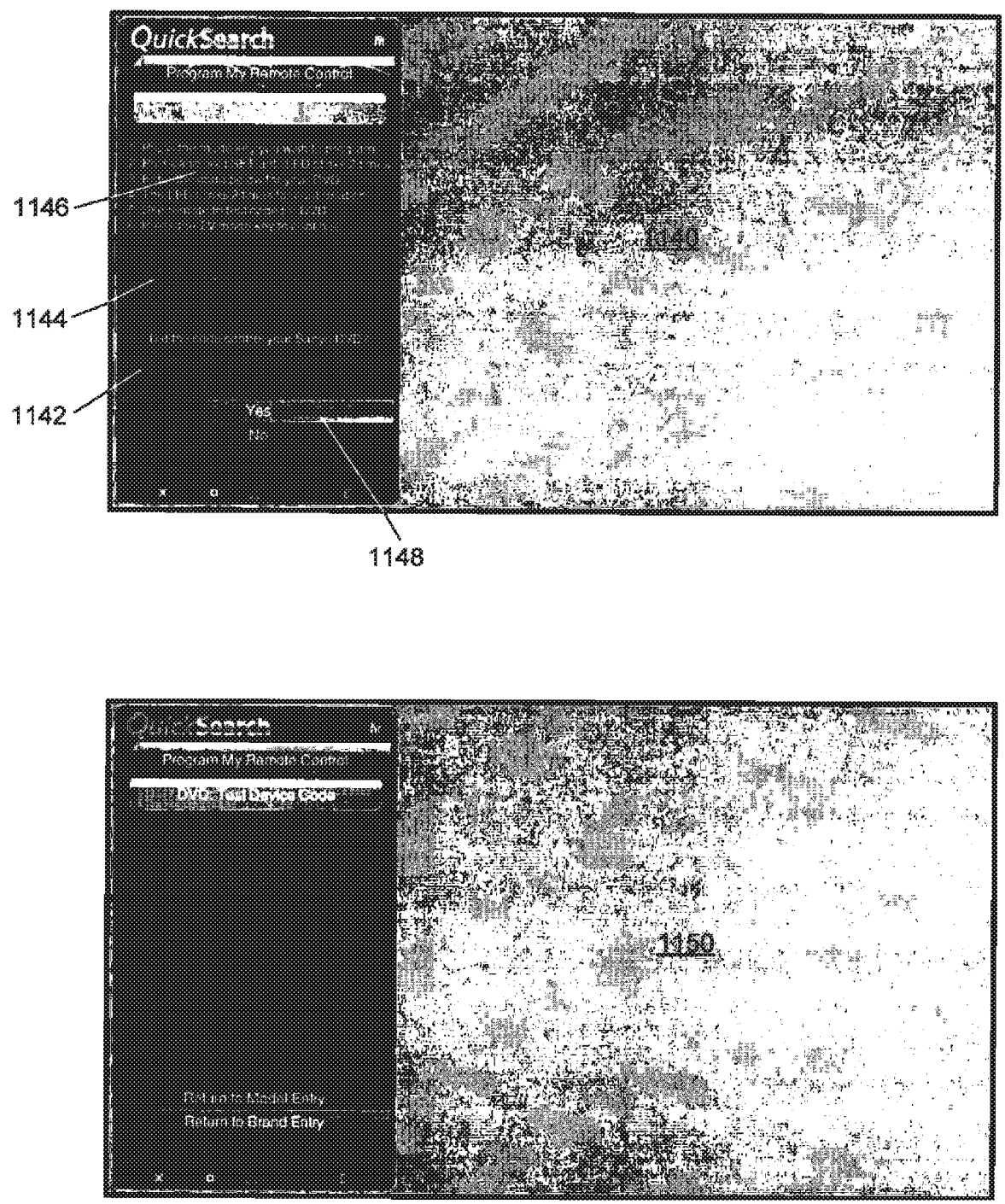
Figure 11D:
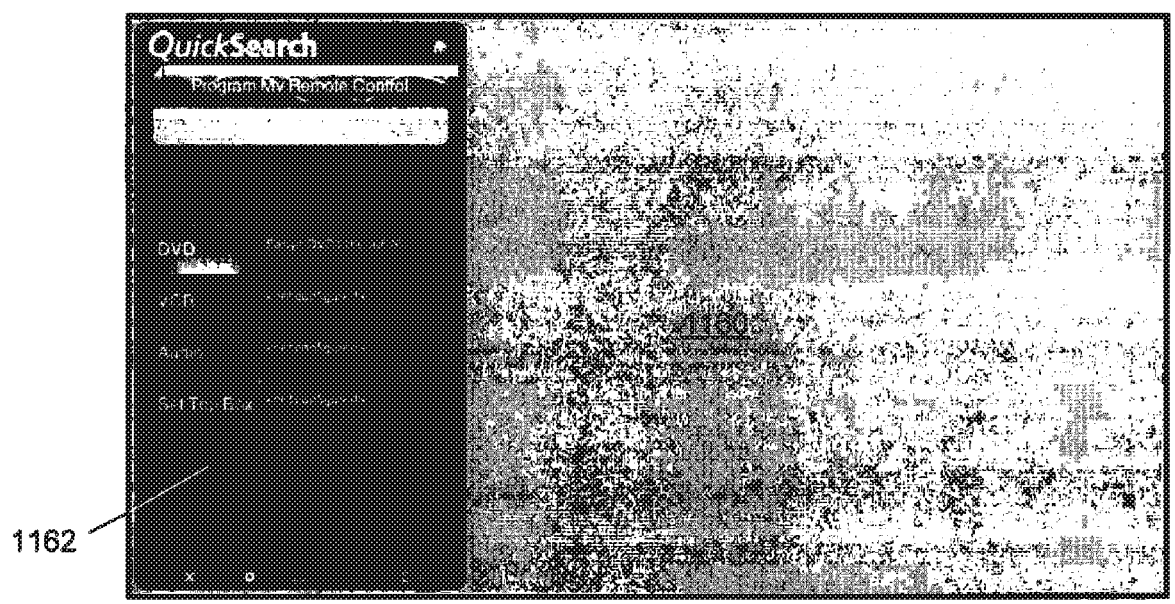

A second exemplary embodiment of the instant invention will now be presented in conjunction with FIGS. 10 and 11. Turning to FIG. 10, an exemplary system 1000 is illustrated wherein the configuration of a universal remote control 101 to command, for example, an AV receiver 1004 and/or a DVD player 1006 may be facilitated via interaction with an Internet enabled TV set 1002. In order to support Internet connectivity and functionality, TV 1002 may be provisioned with a software platform such as Yahoo Connected TV, Google TV, etc., which platforms may support download and installation of third-party applications, often referred to in the art as "Apps" or "Widgets". Such third party applications (hereafter referred to as a "widgets") may be readily developed using SDKs provided for this purpose by the platform vendor and may be designed for permanent or temporary installation into a storage device 1012 provided for that purpose as part of a suitably equipped TV set 1002. It will be appreciated that storage 1012 may take the form of any type of readable and/or writeable media, such as, for example, internal flash or RAM memory, a memory stick, a hard disk, a smart card, etc., as appropriate for a particular implementation. A manufacturer or developer of a universal controlling device 101 may accordingly develop and make available a widget to assist users in the set up of the controlling device 101. As will be appreciated, such a set up widget 1020 may be made available online for user selection and download from an Internet accessible server 1010, or alternatively such a widget may be preinstalled in TV 1002 by the manufacturer of that TV, for example in cases where controlling device 101 is provided together with TV 1002.

Once installed and activated by a user, widget 1020 may serve to guide the user through set up of controlling device 101 as will now described in conjunction with FIGS. 11a through 11d, which figures comprise a series of exemplary displays on TV 1002 during set up of an exemplary device. While the displays presented in these exemplary figures are typical of those which may be generated during execution of such a set up widget on a Yahoo Connected TV compatible appliance, it will be appreciated that alternate widget embodiments may utilize other suitable Internet TV platforms and, as such, the particular format and/or layout of the presented displays is by way of illustration only and not intended to be limiting in any manner.

Activation of the set up widget 1020 may occur via selection of an on-screen icon 1102 from a home screen 1100. Such selection may be performed, for example, via the use of navigation keys 214 of controlling device 101 to move a cursor on TV display 1100 until icon 1102 is highlighted, followed by activation of a select key 222. As will be appreciated, other methods of selection for example cursor movement by gesture or touchpad input, explicit character entry, dropdown menu selection, etc., may be available in particular implementations of TV 1002, and accordingly the term "selection" hereafter should be understood to comprise any such method or any other equivalent, as appropriate for a particular implementation.

Once activated, widget 1020 may reference a database of appliance model and setup code information 1040 to enable a model-based set up code search. All or part of database 1040 may be stored locally on TV 1002, either configured at time of manufacture or downloaded as part of or in conjunction with widget 1020; or may be located on a remote server 1014 (which may be part of or separate from server 1010) and accessed via Internet connection 1008. With reference to screen display 1110, setup widget 1020 may commence by displaying a listing 1112 of available appliance device types from which a user may select a desired device for configuration, for example selecting the "DVD" item 1114 from list 1112 in order to commence configuration of controlling device 101 to command operation of DVD player 1006. Upon selection of a device to be configured, a user may next be presented with display 1120 comprising a prompt 1124 to begin entry of a brand name for the DVD player to be configured, together with an alphanumeric keyboard 1122. As a user enters a brand name by selecting a series of characters from keyboard 1122, widget 1020 may concurrently scan database 1040 and commence an interactive display of available brand names which match the partially completed user entry. By way of example, as illustrated, after a user has entered the first three letters "s-a-n" 1126, widget 1020 may automatically display of list of matching brand names 1128, for example "Sansui" and "Sanyo". At any time, a user may select a brand name, which selection may result in display 1130 where, in a similar manner to that described above, a user may next enter model number information and select a matching or closely matching entry from an interactive list of model numbers 1132. It will also be appreciated that selection of a brand and/or model of an appliance to this same end may also or alternatively be facilitated through the use of menus, tree structures, or the like without limitation.

Once a brand and model for an appliance have been selected, as illustrated in display 1140 widget 1020 may present set up instructions 1142 suitable for configuring controlling device 101 to operate the desired appliance, for example a Sanyo DWM1000M DVD player 1006. Displayed set up instructions 1142 may include a set up code number 1144 corresponding to a command code set considered most likely to operate appliance 106. After a user has utilized this set up code number to configure controlling device 101, for example by following displayed instructions 1146, the user may be requested to test the controlling device and report the outcome to set up widget 1020 via a communication to the device upon which the set up widget is operating, for example to select from presented "yes" or "no" icons 1148. If a "no" response is input, set up widget 1020 may display the next most likely set up code number corresponding to the specified appliance brand and model and the above configure and test steps may be repeated. If all likely set up codes have been exhausted, a display 1150 may be presented to this effect, possibly together with guidance on where additional assistance may be obtained, for example a customer service telephone number, a Web site URL, etc. (not illustrated.) In some embodiments, such guidance may vary depending on current circumstances, for example, a type and/or brand of appliance or controlling device being configured, data stored from previous set up sessions, etc. If on the other hand a successful set up is reported, for example by user selection of "yes" from display 1140, a completion display 1160 may be presented comprising panel 1162 from which a user may exit the set up widget or may select another device type to be configured.

It will be appreciated that in various embodiments the exact nature of many of the steps describe above may be varied not only according to the specific Internet enabled TV platform being used, but also according to the capabilities of the controlling device involved. For example, while the illustrative steps presented above are generally suitable for configuration of conventional controlling devices which do not include any special adaptation or accommodation for use in conjunction with interactive setup widgets, support for controlling devices with a greater degree of interaction may also be provided within particular embodiments of widgets. For example, in cases where a controlling device such as device 100 of the earlier-described embodiment is to be configured, interactions such as those previously described in conjunction with the flowchart of FIGS. 7 and 9 may be incorporated, mutatis mutandis, into set up widget 1020. By way of further example, in cases where the controlling device to be configured is capable of bi-directional communication with the platform appliance upon which a set up widget is implemented, the user set up code number entry steps described in conjunction with display 1140 of FIG. 11 may be replaced by a direct download of the set up code number, or even the code data itself, into the controlling device.

Various other modifications or enhancements to the embodiments described above will be apparent to those of skill in the art. For example, certain controlling devices may be adapted to identify themselves to a set up widget, using for example a distinctive infrared or RF transmission, thus allowing the set up widget to automatically determine a suitable method of interaction, device command library, etc., for use during the set up process. The command code database searched by the set up widget may comprise a local portion and a remote portion wherein the local portion is searched first and the remote portion accessed only if no suitable code set is found in the local portion, as further described for example in U.S. Pat. No. 7,046,161, of like assignee and incorporated herein by reference in its entirety. In a yet further embodiment, a set up widget may upload copies of controlling device settings, configurations, etc., to server 1014 for storage and potential future retrieval by a user, for example upon acquisition of a new or additional controlling device or appliance. Alternatively or in conjunction with such a service, server 1014 may aggregate such uploaded data for statistical purposes, to generate user preference information, to offer product recommendations, etc., as further described for example in U.S. Pat. No. 7,093,003 of like assignee and incorporated herein by reference in its entirety.

While specific embodiments of the present invention have been described in detail, it will be appreciated by those skilled in the art that various modifications and alternatives to those details could be developed in light of the overall teachings of the disclosure. For example, it should be appreciated that any of the above described methods can be used alone or in combination to setup the remote controls 100 or 101. Additionally, as noted, the functionality of the universal remote controls 100 or 101 can be included in other devices such as PDAs, personal computers, home devices, or the like thus also making such devices a controlling device like a universal remote control. Further, while the exemplary embodiment above is presented in terms of interactions between a set top box or an Internet-connected TV and a universal remote control, it will be appreciated that many other appliance types, e.g. PVRs, DVDs, PCs, etc. may be substituted for these devices without altering the spirit of the invention. Accordingly, it will be understood that the particular arrangements and procedures disclosed are meant to be illustrative only and not limiting as to the scope of the invention which is to be given the full breadth of the appended claims and any equivalents thereof.

All of the cited patents and patent applications are hereby incorporated by reference in their entirety.

What is claimed is:

1. A non-transitory, computer readable media having instructions stored thereon, the instructions, when executed by a processing device of a first controllable appliance, performing steps for configuring a controlling device, the steps comprising:

causing a plurality of interactive prompts to be displayed in a display device associated with the first controllable appliance wherein the plurality of interactive prompts are used to elicit one or more communications from the controlling device to identify at least a brand of a second controllable appliance;

in response to at least the brand of the second controllable appliance being identified via the one or more communications, repeatedly causing a communication to be transmitted to the controlling device to cause a different code data for controlling a same observable functional operation associated with at least the identified brand of the second controllable appliance to be provisioned on the controlling device and causing a further interactive prompt to be displayed in the display device wherein the further interactive prompt is used to elicit a further communication from the controlling device to confirm that a transmission of a command from the controlling device to the second controllable device, created via use of a currently provisioned one of the different code data, caused the second controllable device to perform the observable functional operation;

in response to the first controllable appliance receiving a positive confirmation that the transmission of the command from the controlling device to the second controllable appliance caused the second controllable appliance to perform the observable functional operation, causing the repeated provisioning of the different code data on the controlling device to be stopped whereupon the controlling device is configured to use the currently provisioned one of the different code data that caused the second controllable appliance to perform the observable functional operation when the controlling device is subsequently utilized to transmit a command to control the observable functional operation of the second controllable appliance via a subsequent activation of an input element of the controlling device that is associated with the observable functional operation of the second controllable appliance.

2. The non-transitory, computer readable media as recited in claim 1, wherein the different code data is pre-stored in a memory of the controlling device.

3. The non-transitory, computer readable media as recited in claim 1, wherein the different code data is received from the first controllable appliance subsequent to at least the brand of the second controllable appliance being identified via the one or more communications.

4. The non-transitory, computer readable media as recited in claim 1, wherein the one or more prompts comprise alphanumeric indicators which are selectable via the one or more communications received by the first controllable appliance from the controlling device.

5. The non-transitory, computer readable media as recited in claim 4, wherein the instructions function to auto-complete at least the brand and model of the second controllable appliance in response to a partial completion of at least the brand of the second controllable appliance via the one or more communications.

* * * * *